(12) United States Patent
Heule et al.

(10) Patent No.: US 8,672,591 B2
(45) Date of Patent: Mar. 18, 2014

(54) PRESSURE-MEDIUM-CONTROLLED COUNTERSINKING TOOL

(75) Inventors: Heinrich Heule, Au SG (CH); Harry Studer, Balgach (CH)

(73) Assignee: Ulf Heule, Balgach (CH)

(*) Notice: Subject to any disclaimer, the term of this patent is extended or adjusted under 35 U.S.C. 154(b) by 821 days.

(21) Appl. No.: 12/722,008

(22) Filed: Mar. 11, 2010

(65) Prior Publication Data
US 2010/0232895 A1 Sep. 16, 2010

(30) Foreign Application Priority Data
Mar. 13, 2009 (DE) .......................... 10 2009 012 996

(51) Int. Cl.
*B23B 51/10* (2006.01)

(52) U.S. Cl.
USPC .............................. 408/57; 408/147; 408/187

(58) Field of Classification Search
USPC .......... 408/59, 57, 147, 187, 56, 60, 54, 188, 408/159
See application file for complete search history.

(56) References Cited

U.S. PATENT DOCUMENTS

| | | | | |
|---|---|---|---|---|
| 3,572,182 A * | 3/1971 | MacDonald | ................. | 408/226 |
| 3,827,821 A * | 8/1974 | Swenson | ........................ | 408/59 |
| 4,224,846 A * | 9/1980 | Eysel et al. | ..................... | 82/158 |
| 5,829,925 A * | 11/1998 | Nordstrom | ...................... | 408/57 |
| 5,848,860 A * | 12/1998 | Steiner | .......................... | 408/159 |
| 5,927,911 A * | 7/1999 | Steiner | .......................... | 408/159 |
| 6,238,150 B1 * | 5/2001 | Yamada et al. | ............... | 408/224 |
| 6,270,295 B1 * | 8/2001 | Hyatt et al. | .................... | 408/1 R |
| 7,322,778 B2 * | 1/2008 | Woodruff et al. | ............ | 408/156 |
| 2005/0163579 A1 * | 7/2005 | Gaiser | .......................... | 408/156 |
| 2005/0166727 A1 | 8/2005 | Peltonen et al. | | |
| 2005/0220550 A1 * | 10/2005 | Beier | ............................. | 408/153 |
| 2010/0014933 A1 * | 1/2010 | Nedzlek | ........................ | 408/156 |
| 2010/0129169 A1 * | 5/2010 | Kyoi et al. | ...................... | 408/26 |

FOREIGN PATENT DOCUMENTS

| | | |
|---|---|---|
| DE | 261536 | 11/1988 |
| DE | 69422648 | 2/1996 |
| DE | 10215004 | 10/2003 |
| EP | 0787050 | 8/1997 |

OTHER PUBLICATIONS

German Patent and Trademark Office Search Report, German Patent Application Serial No. 102009012996.0, dated Feb. 23, 2010.
EPO Search Report in corresponding EP Application No. 10001982.7, Jun. 28, 2010.

\* cited by examiner

*Primary Examiner* — Eric A Gates
*Assistant Examiner* — Paul M Janeski
(74) *Attorney, Agent, or Firm* — Wood, Herron & Evans, LLP

(57) ABSTRACT

A pressure medium controlled countersinking tool with one or more chip-removing knives, which can be activated by feeding in a pressure medium, in which for activation of at least one knife this is flowed in by a control medium.

7 Claims, 7 Drawing Sheets

Retracted

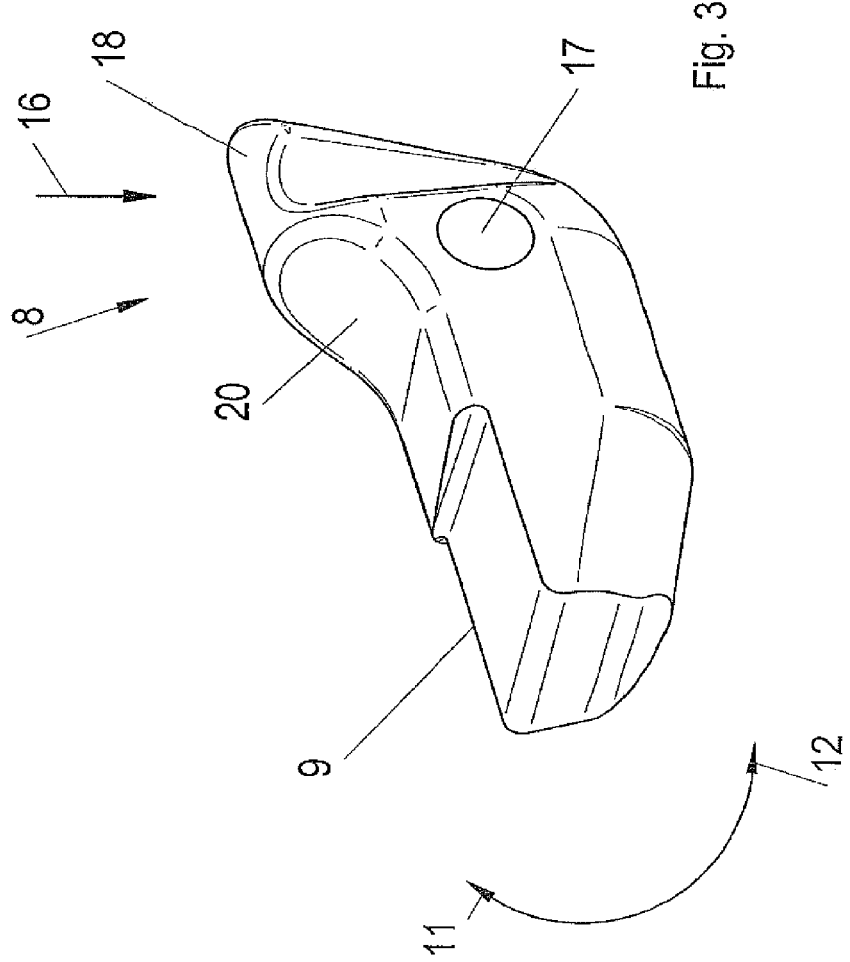

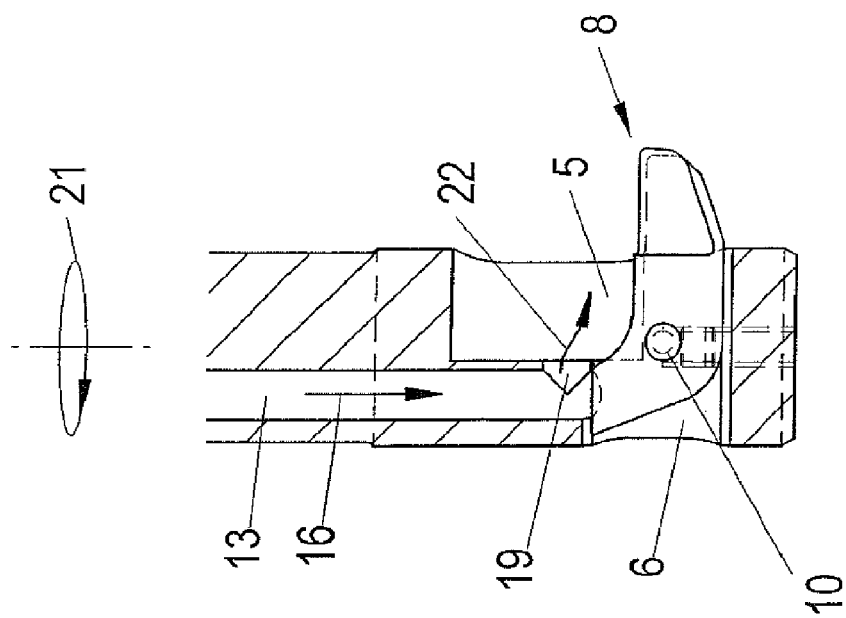
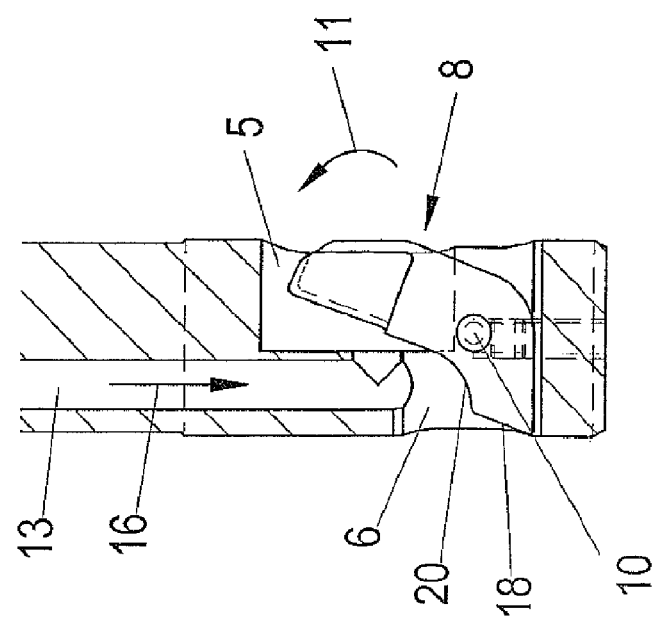

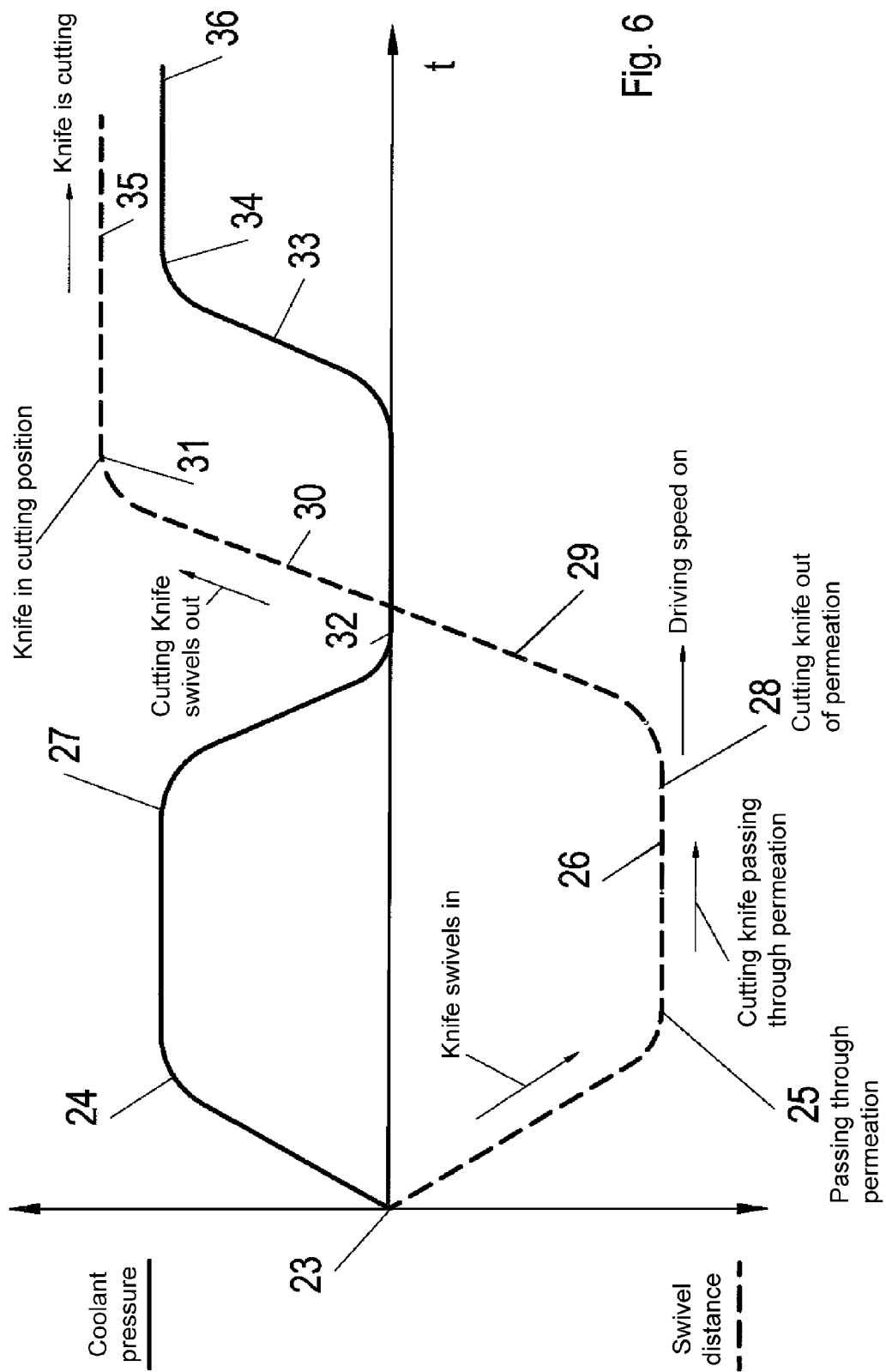

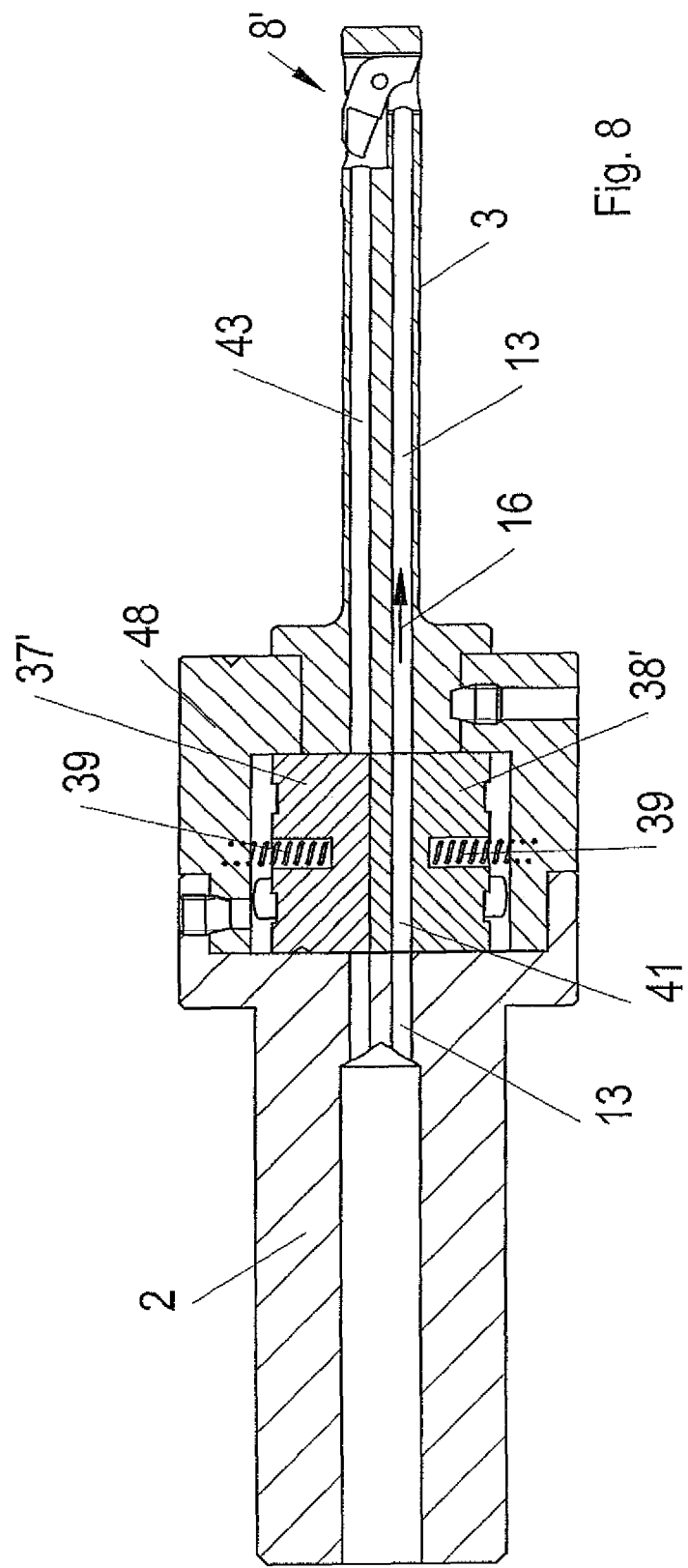

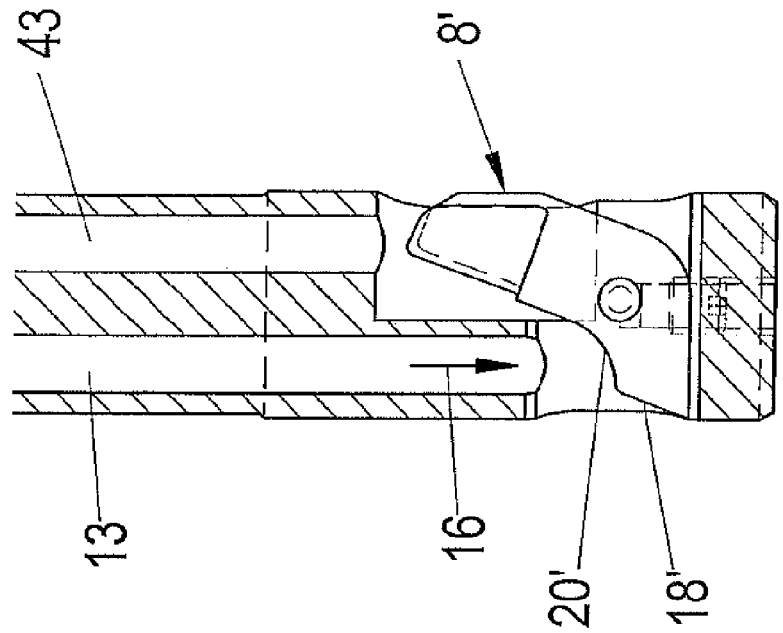
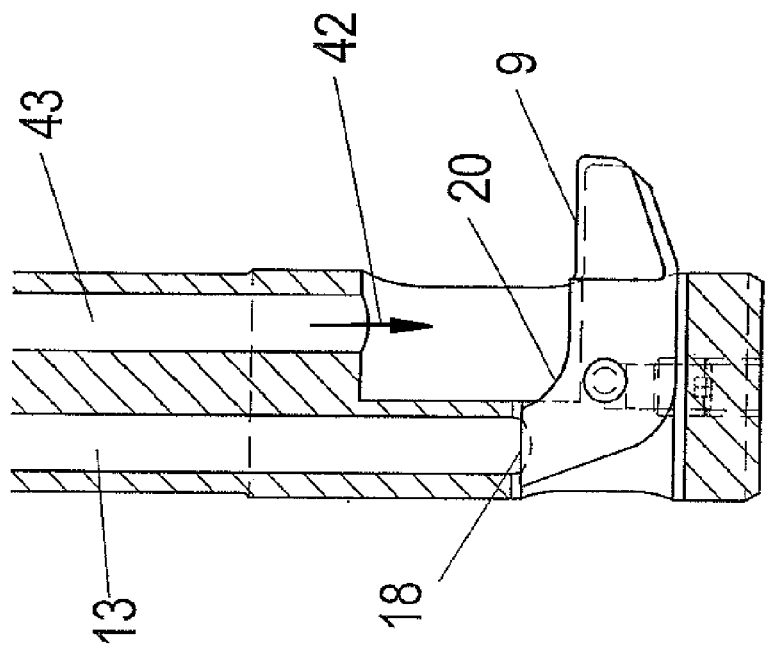

PRESSURE-MEDIUM-CONTROLLED COUNTERSINKING TOOL

The object of the invention is a pressure-medium—and particularly coolant—controlled countersinking tool according to the generic term in patent claim 1.

Developments of the Swedish firm Grandlund have made coolant-controlled countersinking tools well known. In them, the pivotal movement of the countersinking tool, however, is not activated directly through a cooling medium streaming from the coolant channel, but through a piston-cylinder assembly.

The term "countersinking tools" is understood here to mean all chip-removing tools that are suitable for spot facing and mold facing. Therefore, it also refers to forward countersinking tools as well as backward countersinking tools. The term "forward countersinking tool" is understood to mean a countersinking tool that countersinks or deburrs the front side of a drilled hole without traveling through the drilled hole.

The term "backward countersinking tool" is understood to mean a countersinking or deburring tool that travels through the drilled hole on the rear side of the drilled hole and on a reverse stroke countersinks or deburrs the rear edge of the drilled hole.

During use of the aforementioned countersinking tools, there is a need to direct the coolant as efficiently as possible, not only directing the coolant from outside to the processing location but from the inside of the tool outward so as to be able to rinse and cool the surfaces of the tool touched by the shavings.

With countersinking tools of this type, there is the problem that especially the knife chamber and the knife window are filled with shavings and these shavings must be removed as economically as possible.

With countersinking tools of this type, it is conventional to reach the cutting knife's outwardly pivoted operating position in the countersinking tool using the centrifugal force that occurs as the tool spins; by centrifugal force, the knife pivots out of the knife window and arrives at the operating position.

Such centrifugal forces especially occur at drive speeds of, for example, 200 to 1,000 revolutions per minute, however, this figure should serve only as an example of the revolution speed at which such a centrifugally controlled tool is driven. This figure should not be understood as a limitation to patent protection.

However, with this type of centrifugally driven countersinking tool, there is the problem that while one can use centrifugal force to bring it securely to a proper operating position, it is not possible to pivot the knife back to a passive position without further means being used. For this, a greater means of propulsion is required in order to make the knife, which has been pivoted out by centrifugal force, pivot back in to a passive state of rest in the knife window.

The purpose of this invention is therefore to execute the rotary movement of at least one cutting knife in a countersinking tool as easily as possible.

As a solution to the problem posed, the invention is characterized by the technical theory for claim 1.

A significant characteristic of the invention is that at least one of the rotary movements (inward pivot or outward pivot) of at least one cutting knife in a countersinking tool is achieved through direct inflow of a pressure medium.

With the given technical teaching, the significant advantage is that for the first time it is now possible to control the cutting knife's rotary movement in the countersinking tool directly with a pressure medium. The term "direct inflow" is understood to mean that the pressure medium acts directly upon an inflow surface of the cutting knife to be operated, without interposition of a piston-cylinder assembly or other actuator.

Here it remains open whether the inwardly directed rotary movement that leads to a passive knife position or the outwardly directed rotary movement that leads to the knife's active operating position is controlled by the pressure medium.

For the purpose of simplicity of description, in the following description it will be assumed that countersinking tool has a single tilting knife, which is mounted eccentrically on a bearing bolt in a knife window on the front side of a knife housing and can swing outward. However, the invention is not limited to this. The invention can also involve several knives that are arranged next to or above one another, that are each driven by an associated pressure medium pressure system, and can pivot inward and outward.

According to a significant feature of the present invention, the pressure medium control consists of a control channel whose outlet opening works directly on a pressure surface of the knife.

With this an especially simple knife drive in the form of a rotary drive by means of the pressure medium is described, because for the first time, this makes it possible to drive the knife's rotary movement itself directly, without interposition of a piston-cylinder assembly.

Here the term "control channel", and a pressure medium flowing through it, are understood to mean various media.

In one embodiment of the invention, it is provided that the control medium be the cooling lubricant, which controls the knife's rotary movement as a liquid cooling lubricant and at the same time rinses and cools the knife and the knife window and the knife chamber.

This leads to special advantages, because this cooling lubricant is directed to a double purpose, namely the cooling of the knife and the work area, where the high temperatures of the chip-removal process occur, and otherwise for excellent rinsing of the knife area, so that the knife chamber and knife window are thereby always kept free of shavings. This means a significant improvement in process reliability when using such a countersinking tool, because the knife can no longer be blocked in the knife window.

At the same time, the coolant is directed from the inside, which leads to the fact that the entire countersinking tool is cooled from inside and in particular that the coolant is sent directly onto the working surface. Thus, the coolant does not need to be directed through external coolant feed nozzles.

Through the knife's direct rotary drive in the countersinking tool by the pressure medium, a special simplification of the design is achieved, because no further parts are needed to cause this rotary movement.

Thus there is only one moving part, namely the knife itself, which is pivot-mounted on an associated bearing bolt in the knife housing.

However, the term control medium is understood to mean also an air medium or even a fluid control medium that is directed through the guide bore in the knife housing and drives the knife's rotary movement. In this case—if the coolant is not simultaneously also the control medium—the cooling medium must be directed from outside through external cooling channels.

Previously it was mentioned that the countersinking tool is controlled by centrifugal force, which means that the tool's rotary drive pivots the knife out of the knife housing and into an active operating position.

However, the invention is not limited to this. In place of a centrifugally guided tool, there are also other means of propulsion for pivoting this knife out of the knife window. Here it involves a spring drive, so that with a spring drive the knife can be pivoted out of the knife window. If, for example, a leg spring is located around the bearing bolt on which the knife is rotatably mounted, this leg spring drives the knife in one direction or the other.

Both directions (outward pivot of the knife and inward pivot of the knife) with spring force are also claimed to be significant to the invention.

Therefore the following combinations exist, which alone or in combination are claimed to be significant to the invention:
1. Outward pivot of the knife with centrifugal and/or spring force Inward pivot of the knife with pressure medium
2. Outward pivot of the knife with coolant and/or spring force Inward pivot of the knife with pressure medium
3. Outward pivot of the knife with pressure medium Inward pivot of the knife with spring force and/or pressure medium For the sake of simplicity, in the following description of the invention only the variants according to numbers 1 and 2 are described, by which number 3 itself results from the combination of the two aforementioned variants and for the specialist is quite obviously derivable from the two aforementioned variants.

The object of this invention arises not only from the object of the individual patent claims, but also from the combination of the individual patent claims together.

All of the documentation, including the summary of disclosed data and characteristics, especially the spatial design depicted in the drawings, are claimed to have significance as inventions, as long as they are new individually or in combination in relation to the state of the art.

Below, the invention will be explained in more detail by means of several drawings that depict manners of execution. In connection with this, further significant characteristics and advantages significant to the invention arise from the drawings and their descriptions.

Depicted are:

FIG. 1: Section of the first variant of a countersinking tool
FIG. 2: Top view of the face in arrow direction II in FIG. 1
FIG. 3: Perspective depiction of the knife
FIG. 4: The countersinking tool according to FIG. 1 with a retracted knife
FIG. 5: The same depiction according to FIG. 4 with the knife extended
FIG. 6: The juxtaposition of a coolant feed in connection with the rotary movement in the course of a procedure
FIG. 7: A section of a second variant of a countersinking tool
FIG. 8: The second operating position of the variant of the countersinking tool according to FIG. 7
FIG. 9: The extended position of the knife according to FIG. 7
FIG. 10: The retracted position of the knife according to FIG. 8

In FIG. 1 a simple form of a countersinking tool 1 is depicted, which primarily consists of a cylindrical base body 2, which is rotary-driven in the direction of its central longitudinal axis and in the execution example shown, in the direction of arrow 21.

In the interior of the base body 2, a supply bore 15 for a pressure medium is located.

For the sake of simplicity, in the following description it is assumed that this pressure medium is a cooling medium that is used as both a pressure medium control for the knife 8, and simultaneously for cooling and rinsing the knife chamber 5 and the knife window 6.

With the help of a fastening screw 4, on the front side of the base body, a likewise cylindrical knife housing 3 is located, in whose interior space leads a longitudinal boring in the form of a control channel 13. In this control channel 13, the control medium 14 is depicted as flowing in arrow direction 16.

At the front side of the knife housing 3, there is a knife chamber 5, in whose upper area a bearing bolt 10 is located, on which the knife 8 is located and rotatable to one side. The knife chamber is extended backward through a knife window 6, and the upper limit of the knife chamber 5 is formed by the face 7 of the knife housing 3.

The knife 8 in FIG. 1 is in an extended operating position in a backward sinking process so that the lower cutting edge 9 lies cutting and removing chips at the edge of a drilled hole that is not further depicted.

According to FIG. 1, the knife is rotated in the direction of arrow 12 into its operating position, while in the direction of arrow 11 it is rotated to its rest position, so that at least the cutting edge 9 is rotated into the knife chamber 5 and the knife thereby goes into its passive non-cutting position.

In the position shown in FIG. 1—in which the knife 8 is in the operating position and in a machining operation on the edge of the drilled hole (not depicted in more detail) the outwardly pivoted position in the direction of arrow 12 is itself maintained through the machining operation, so that also in this position the control medium 14 flows through the control channel 13 in the direction of arrow 16 into the knife chamber 5, where a double flow path is provided. On the one side, this medium flows on to the pressure surface 18 (see FIG. 3) of the knife 8 and tries to pivot the latter back into its passive position in the direction of arrow 11, which does not succeed, however, because the knife is still in the cutting operation with the edge of the drilled hole. On the other side, a part of the pressure medium stream enters through a bypass bore 19 directly into the knife chamber 5 and rinses the knife chamber 5 and at the same time cools the working surface of the cutting edge 9 on the associated edge of the drilled hole. Therefore, even during the machining process, the knife chamber 5 and the knife window 6 are rinsed with the cooling medium.

FIG. 2 shows the front view of the entire assembly, from which it can be seen that the knife 8 is pivoted into its operating position outside the knife chamber 5.

FIG. 3 shows a perspective depiction of the knife 8, from which it can be seen that the cutting edge 9 is located in the area of a cutting surface and that there are altogether two pressure surfaces 18, 20 touched by the control medium.

In the position depicted in FIG. 1, the stream of pressure medium flows in the direction of arrow 16 onto the upper pressure surface 18 and attempts to bring the knife into its inwardly pivoted position in the direction of arrow 11.

The second pressure surface 20 comes into use according to the depiction in FIG. 4.

FIG. 4 shows that the rotary drive for the countersinking tool 1 is eliminated and that now the pressure medium propulsion operates in the direction of arrow 16 on the pressure surface 18. This pivots the knife in the direction of arrow 11 in its retracted position, and in this retracted position the pressure medium will act on the pressure surface 20 of the knife 8 in the direction of arrow 16, to lock it in the retracted position.

However, if the knife is extended, as shown in FIG. 1 and FIG. 5, the pressure medium must temporarily be removed from the control channel 13, i.e., there is no pressure in the control channel. Then the rotary drive in the direction of arrow 21 is switched on so that the knife pivots out in the direction of arrow 12 and comes into the outward-rotated position in FIG. 5.

In this position the pressure medium can then be directed to the control channel 13, and then preferentially flows through the bypass bore 19 in the direction of arrow 22 into the knife chamber 5 and at the same time rinses the knife window.

This applies first if the countersinking tool is in the process of machining a drilled hole, which is shown in more detail in the flowchart in FIG. 6.

On the upward ordinate the coolant pressure is depicted, whereas on the downward ordinate the knife's pivot path is plotted.

The downward pivot path in FIG. 6 indicates the retracted position of the knife, while the upward pivot path (positive values of the pivot path) indicates the extended position of the knife.

Proceeding from position 23, it is next assumed that there is no coolant pressure and that the knife is in an undefined central position.

In the branch of curve between positions 23 and 24, the pressure medium is switched on and the pressure medium now acts in the direction of arrow 16 on the pressure surface 18, so that the knife is retracted in the curve area between 23 and 24 and in position 25 has reached its perfect retracted position.

In the transition between position 25 and position 26, the knife then travels through the drilled hole, where the coolant pressure is sustained between positions 24 and 27.

From position 28, the knife moves into the retracted position out of the drilled hole and reaches the rear edge of the drilled hole.

Therefore, at position 27, the coolant eases and loses its perfect pressure up to position 32.

While now there is no more coolant pressure exerted on the knife 8, centrifugal force rotates the knife outward by starting the rotary drive of the countersinking tool, and moves it by centrifugal force out of the knife chamber 5, so that with positive values at position 32 in the branch of curve 30 it begins its outward pivot path.

The outward pivot occurs until position 31, where it is significant that from this position the coolant pressure is removed in order to achieve a complete outward pivot.

At position 31 the knife enters a machining engagement with a work piece (not shown in more detail), and at the same time the coolant raises to a maximum pressure up to position 34 over the branch of the curve 33, so that the from the machining engagement there is perfect inflow of coolant.

In the position between 34, 35 and 36, the knife's actual operating position occurs, which is in machining engagement with the work piece (not shown in more detail).

The return pivot of the knife 8 into the knife chamber 5 after the end of the chip-removal operation occurs in an analogous manner.

At position 31, the coolant pressure should therefore be as low as possible in order to bring the knife in a stable outwardly pivoted position.

After the end of the chip removal process, the entire process occurs backwards in an analogous manner, i.e., the coolant is next removed, then the knife is brought out of machining engagement with the work piece, then the countersinking tool's rotary drive is stopped, after which the coolant is turned on and the knife clicks into the knife window 6, and then the countersinking tool is moved back with the knife 8 that is rotated into the knife housing 3 by the through-hole.

FIGS. 7 to 10 show variations on the first design mentioned, for which it is pointed out that the same reference signs apply to the same parts. Also, the same processes apply, so that reference will be made only to the significant differences in the design according to FIGS. 1 to 6.

FIG. 7 depicts a knife guided through two control channels 13, 43.

With a switching valve controlled by centrifugal force, the pressure medium is switched back and forth between control channel 13 and control channel 43.

Figure 1:
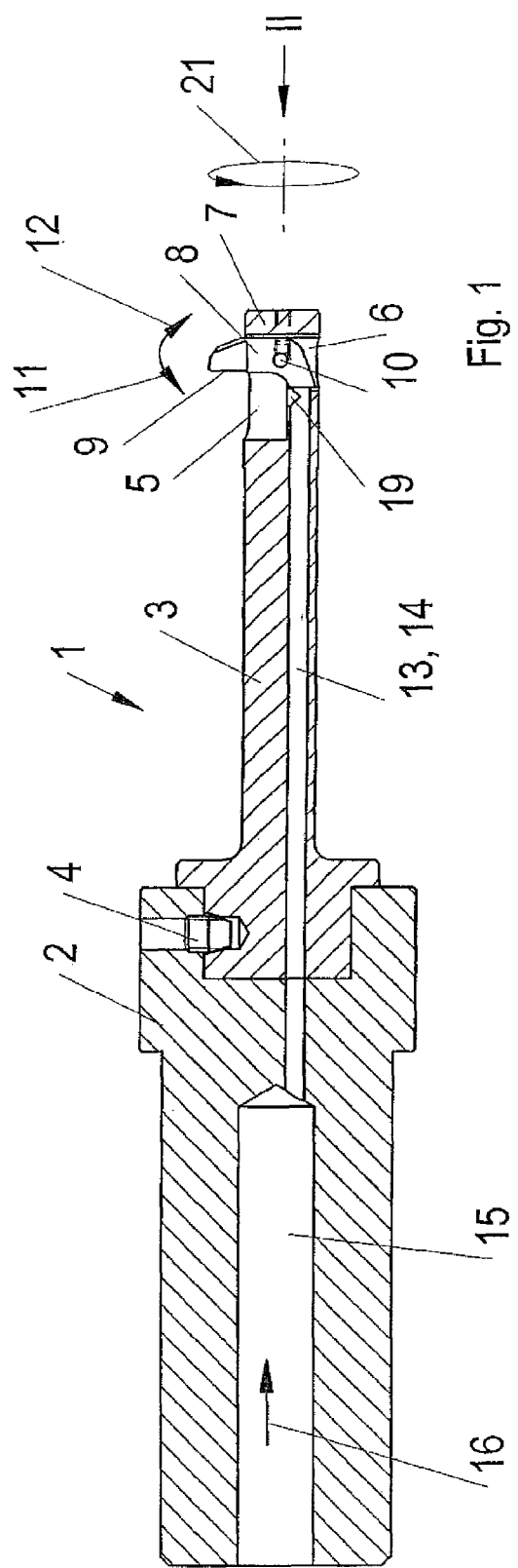
Figure 2:
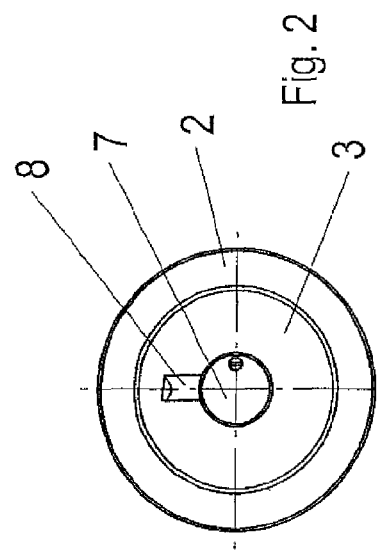
Figure 7:
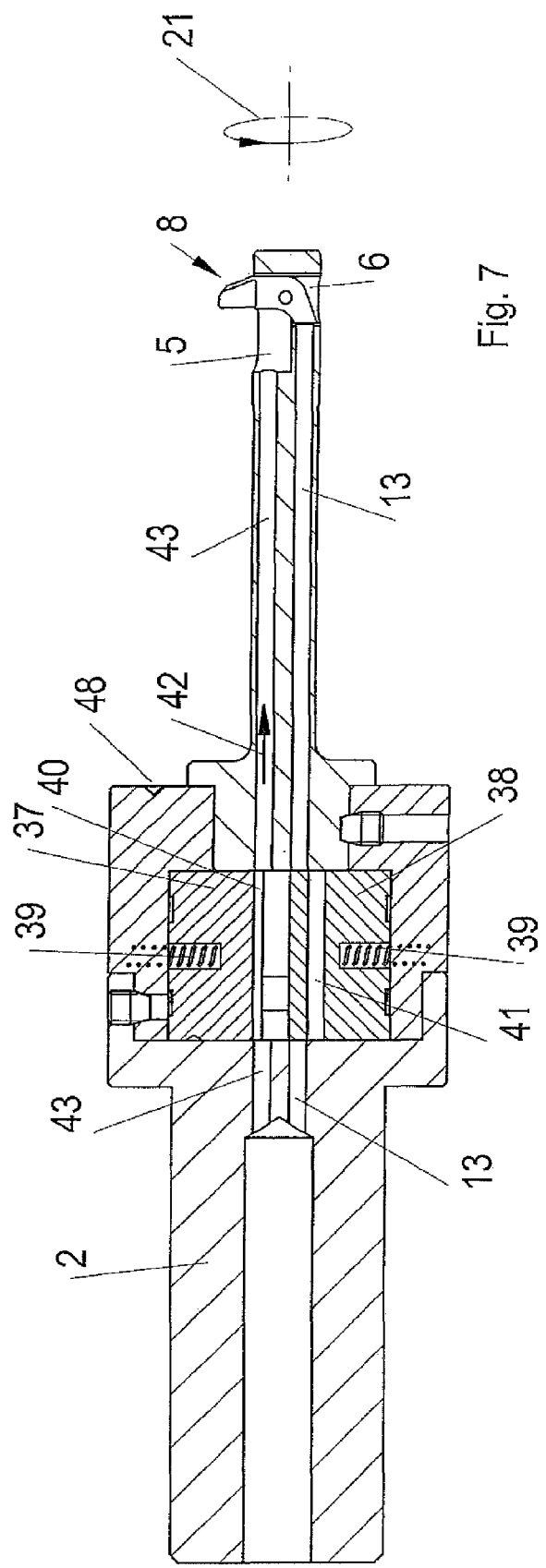

In the position depicted in FIG. 7, the countersinking tool 1 is shown in its operating position. i.e., it is propelled in the direction of arrow 21, and the knife 8 is pivoted out of the knife chamber 5 by centrifugal force. In this position both centrifugal bodies 37, 38, which are each pressed outward by a pressure spring 39 from the housing wall of a control housing 48, are pressed to their wall in the interior space of the control housing 48 against the force of the pressure spring 39.

This switches a control channel 43 to passage, while the other control channel 13 is switched off.

With this, the control medium flows in the direction of arrow 42 from the rear control channel 43 through the connection channel 40 in the control housing 48 into the control channel 43 in the direction of arrow 42 and moves the knife out, holds it in its outward-pivoted position and cools this knife at the same time.

Here it is pointed out that the knife can not only be pivoted outward by centrifugal force, but can also be held by the pressure in the control channel 43 in its outward-pivoted position according to FIG. 7.

FIG. 7 shows the combination of both types, in which centrifugal force supports the pressure of the control medium out of the control channel 43 and both forces hold the knife 8 in the outward-pivoted position.

For reaching the inward-pivoted position, the centrifugal force drive is removed, so that both centrifugal bodies 37, 38, each under the force of its pressure spring 39, come into the radial inward position in the control housing 48, and thus the connection channel 40 is closed and at the same time a connection channel 41 is opened, which creates the connection between the channel 13 from the base body 2 to the channel 13 in the knife housing 3.

The pressure medium thereby flows in the direction of arrow 16 through the control channel 13 in the knife housing 3 and pivots the knife 8 into its retracted position 8', as shown in FIG. 8.

FIGS. 9 and 10 show both pivot positions of the knife 8 again in an expanded depiction in comparison to FIGS. 7 and 8. It can be recognized that these two control bores act on separate pressure surfaces 18, 20 to drive the knife.

In FIG. 9, the media stream from the control channel 43 in direction of arrow 42 acts on the pressure surface 18, 20 in connection with the open space in which the cutting edge 9 is located.

In the retracted position according to FIG. 10, the media stream from the control channel 13 in the direction of arrow 16 next acts on the pressure surface 18 and then with the further inward pivot on pressure surface 20.

As previously mentioned, the various embodiments of the invention can also involve several knives that are arranged next to or above one another, and that are each driven by an associated pressure medium pressure system, and can pivot inward and outward. See FIGS. 9 and 10 for example.

Key to Drawings

1 Countersinking tool
2 Base body
3 Knife housing

4 Fastening screw
5 Knife chamber 29 Position
6 Knife window
7 Face
8 Knife
9 Cutting edge
10 Bearing bolt
11 Direction of arrow
12 Direction of arrow
13 Control channel
14 Control medium
15 Supply bore
16 Direction of arrow
17 Drilled hole
18 Pressure surface
19 Bypass bore
20 Pressure surface
21 Direction of rotation
22 Direction of arrow
23 Position
24 Position
25 Position
26 Position
27 Position
28 Position
29 Position
30 Branch of curve
31 Position
32 Position
33 Branch of curve
34 Position
35 Branch of curve
36 Branch of curve
37 Centrifugal body
38 Centrifugal body
39 Pressure spring
40 Connection channel
41 Connection channel
42 Direction of arrow
43 Control channel
44 Deflecting channel
45 Direction of arrow
46 Blade surface
47 Blade surface
48 Control housing

The invention claimed is:

1. A pressure medium controlled countersinking tool comprising:
    a tool housing having a knife window, and
    at least one chip-removing knife pivotally mounted to the tool housing for movement to and between a cutting position extending out of the window and a non-cutting position retracted into the window,
    the at least one knife pivoted to the extended cutting position by centrifugal force acting upon the knife, and
    the at least one knife pivoted to the retracted non-cutting position by force from a pressure medium flowing upon the knife.

2. A countersinking tool according to claim 1, wherein the pressure medium also provides for rinsing and cooling of the knife.

3. A countersinking tool according to claim 1 or 2, wherein the countersinking tool has a single knife mounted eccentrically on a bearing bolt on the knife housing.

4. A countersinking tool according to claim 1 or 2, wherein the countersinking tool has several knives that are arranged next to or above one another, that are each driven by an associated pressure medium and can pivot outward and inward.

5. A countersinking tool according to claim 1 or 2, wherein the pressure medium flows through a control channel in the tool housing and out a control channel outlet and acts directly on a pressure surface of the knife.

6. A countersinking tool according to claim 1 or 2, wherein the tool housing includes a bypass bore and wherein when the knife is in the extended position the pressure medium flows through the bypass bore and rinses the knife window.

7. A pressure medium controlled countersinking tool comprising:
    a tool housing having a knife window and first and second pressure medium flow passages,
    at least one chip-removing knife pivotally mounted to the tool housing for movement to and between a cutting position extending out of the window and a non-cutting position retracted into the window, and
    a centrifugal force controlled switching valve configured to switch a pressure medium back and forth between the first flow passage and the second flow passage,
    the at least one knife pivoted to the retracted non-cutting position by force from the pressure medium flowing through the first flow passage and upon the knife,
    the at least one knife pivoted to the extended cutting position by force from the pressure medium flowing through the second flow passage and upon the knife.

* * * * *